(12) United States Patent
Mjelstad

(10) Patent No.: US 7,158,703 B2
(45) Date of Patent: Jan. 2, 2007

(54) POWER UMBILICAL FOR DEEP WATER

(75) Inventor: Einar Mjelstad, Fredrikstad (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 11/343,229

(22) Filed: Jan. 30, 2006

(65) Prior Publication Data
US 2006/0193572 A1 Aug. 31, 2006

(30) Foreign Application Priority Data
Feb. 11, 2005 (NO) .................. 20050772

(51) Int. Cl.
G02B 6/00 (2006.01)

(52) U.S. Cl. ..................................... 385/101
(58) Field of Classification Search ................ 385/101; 174/47
See application file for complete search history.

(56) References Cited

U.S. PATENT DOCUMENTS

| 3,879,097 | A | * | 4/1975 | Oertle ....................... 340/855.1 |
| 6,012,495 | A | * | 1/2000 | Antonsen ..................... 138/131 |
| 6,046,404 | A | * | 4/2000 | Figenschou et al. .......... 174/47 |
| 6,472,614 | B1 | | 10/2002 | Dupont et al. .............. 174/705 |

FOREIGN PATENT DOCUMENTS

GB 2183402 6/1987

OTHER PUBLICATIONS

Norwegian Search Report- Oct. 25, 2005.

* cited by examiner

Primary Examiner—Chau N. Nguyen
(74) Attorney, Agent, or Firm—Sofer & Haroun, LLP

(57) ABSTRACT

A subsea umbilical includes electrically insulated power conductors, fiber optic elements, electrical signal cables, and fillers within a common outer cover. At least one of the electrical signal cables is enclosed within a dedicated metal tube, and the umbilical is hung off on an offshore platform or the like and the metal tube containing the electrical signal cable is hung off separately from the umbilical.

6 Claims, 2 Drawing Sheets

POWER UMBILICAL FOR DEEP WATER

RELATED APPLICATION

This application is related to and claims the benefit of priority from Norwegian Patent Application No. 2005 0772, filed on Feb. 11, 2005, the entirety of which is incorporated herein by reference.

FIELD OF THE INVENTION

The present invention relates to improvements in umbilicals particularly umbilicals for use in deep water applications.

BACKGROUND

An umbilical consists of a group of one or more types of elongated active umbilical elements, such as electrical cables, optical fiber cables or tubes, cabled together for flexibility and over-sheathed and/or armoured for mechanical strength and ballast. Umbilicals are used for transmitting power, signals and fluids to and from a subsea installation via the various elongated umbilical elements. An increasingly important use of umbilicals is the transmission of electrical power to electrical devices on the seabed, and depths of up to 2000 meters are common.

Generally the elements are arranged within the umbilical as symmetrically as possible. The cross-section is preferably circular. In order to fill the interstitial voids between the various umbilical elements and obtain the desired circular configuration, filler components may be included within the voids.

Umbilicals have to be able to withstand substantial laying and service loads and load combinations, and perform their functions for an extended design life.

Electrical and/or optical cables are not designed to resist the loads applied to the umbilical. These hoses and tubes, generally made of thermoplastic material are designed merely to resist collapse.

The elements are normally wound in a helical pattern around a central core. The core may be a larger steel tube, or one of the umbilical elements for instance a power cable. With the helically wound elements, such an umbilical under normal conditions will be able to withstand the moderate loads to be applied to it without the addition of substantial armouring layers.

However, under severe conditions such as in use in deep water and/or in dynamic applications increased loads will be applied to the umbilical, due to the weight of the umbilical and to the dynamic movement of water. Strengthening elements and ballast elements have to be added to the umbilical to withstand these loads.

Armoured cables to be supported from an offshore platform are known from GB 2 183 402.

U.S. Pat. No. 6,472,614 discloses an umbilical comprising a plurality of steel tubes helically wound around a core and at least one substantially solid steel rod helically wound around said core, said rod being shaped and sized for absorbing tensile loading on said umbilical. The steel rod is arranged in a void between the steel tubes. The umbilical comprises at least one elongated umbilical element selected from the group consisting of optical fiber cables, electrical power cables and signal cables.

OBJECT OF THE INVENTION

An object of the present invention is to provide an umbilical which can be used in dynamic or deep-water application especially in depth of more than 2000 meters.

One problem, which arises in umbilicals with at least one signal cable for deep-water application is that the copper conductors of the signal cables elongate to the yield limit of the copper. Armouring processes are working very slowly and should be limited to the absolutely necessary layers. It is a further object of the invention to make the umbilical torque balanced.

SUMMARY OF THE INVENTION

In an umbilical according to an important feature of the invention at least one of the signal cables is enclosed within a dedicated metal tube, and the umbilical is hung off on an offshore platform or the like and the metal tube containing the electrical signal cable is hung off separately from the umbilical.

In a preferred embodiment of the invention the signal cable is arranged off-set from the central umbilical axis.

The metal tube isolates the signal cable from impact of increased friction factor (local stress within the umbilical) when maximum tension and minimum bending radius occur for the umbilical design. The signal cable lives its own life within the metal tube and is hung off independent of the hang-off for the umbilical. This gives the signal cable element a potential reaching deeper than 2000 meters and the same applies for the power umbilical design.

One main advantage of the invention is that the umbilical can be delivered with standard elements.

Other features of the invention will become apparent from the following description of embodiments of the invention, with reference to the accompanying drawings.

DETAILED DESCRIPTION

Figure 1:
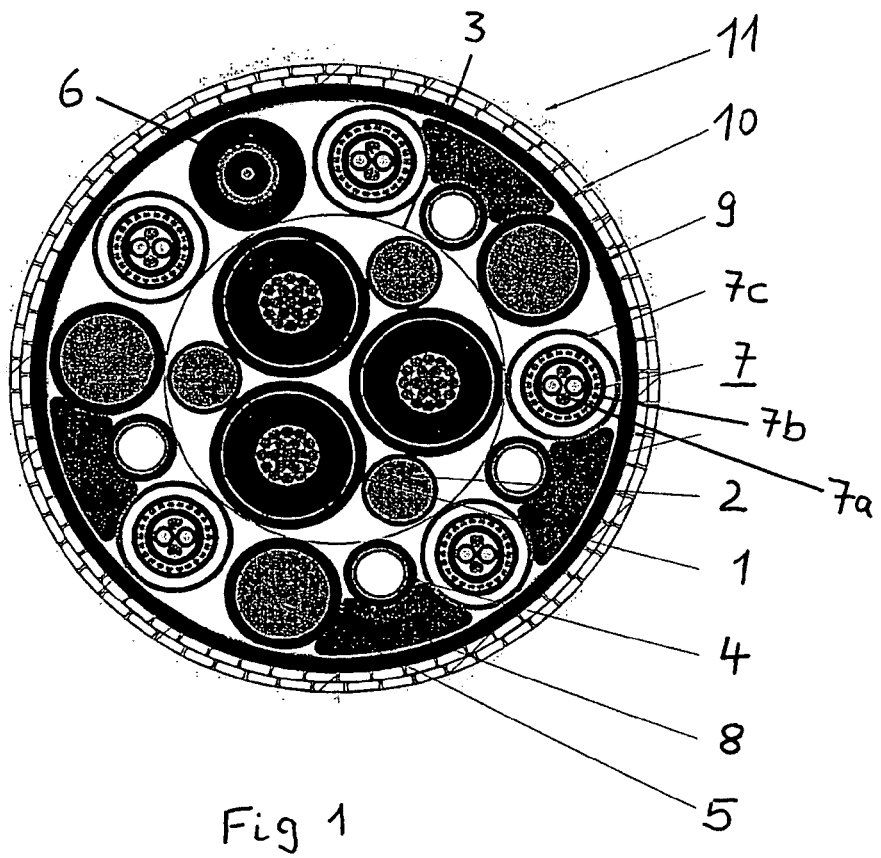
FIG. 1 is a cross-sectional view of an umbilical according to an embodiment of the invention.
Figure 2:
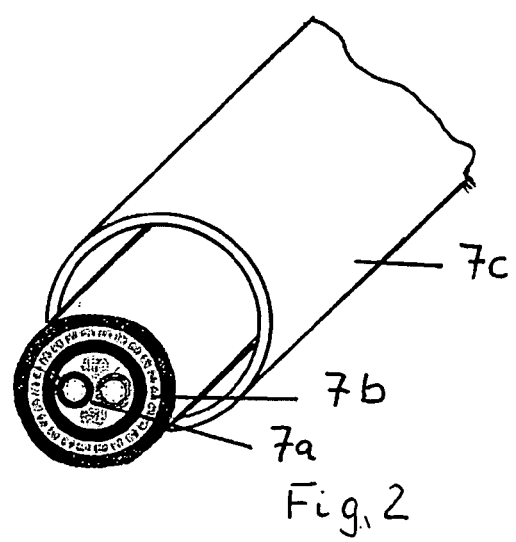
FIG. 2 is a view of an electrical signal cable to be used in an umbilical according to the present invention.

The umbilical 11 shown in FIG. 1 comprises a center core, which consists of three single core power cables 1, which are stranded to a cable bundle. Three steel ropes 2 sheathed with a layer of thermoplastic material are arranged in interstices between the single core power cables 1. The power cables and the steel ropes 2 are surrounded by a wrapping of a steel tape 3 or other tension proof material. Several elements as steel tubes 4, further steel ropes 5 sheathed with polymeric material, a fiber optic cable 6 and signal cables 7 are laid to the surface of the center core. Fillers 8 are arranged between some of the elements.

The outer sheath comprises an inner sheath 9, a steel armouring 10 and an outer layer of polyethylene. According to the invention the signal cables 7 consist of an electrical pair 7a or quad which is surrounded by a steel armour 7b and a steel tube 7a. The steel tube 7c consists of super duplex steel. The steel tube 7c may be seamless or may have a laser welded longitudinal seem.

Figure 3:
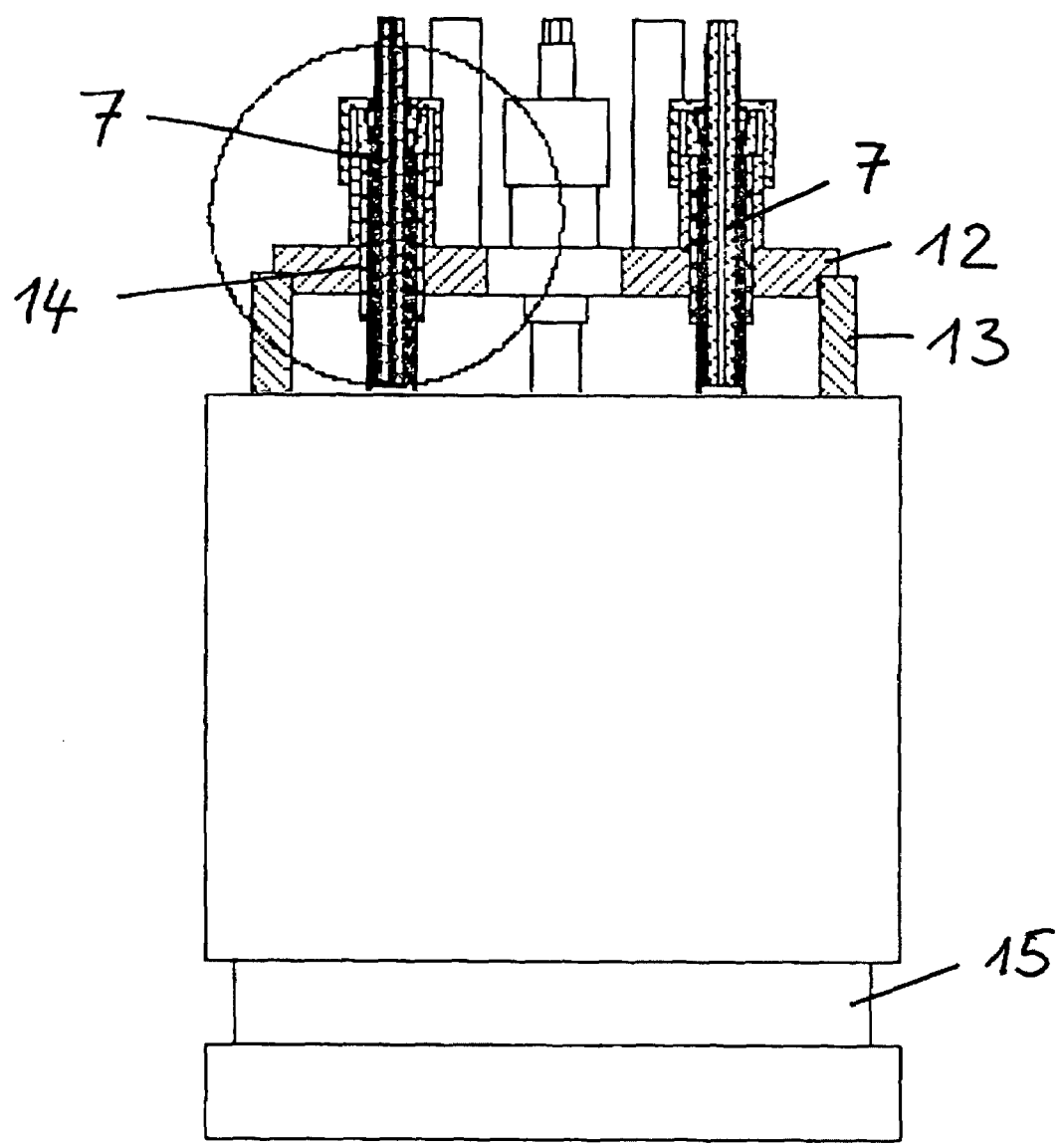
FIG. 3 shows a side view of a part of an off-shore platform with the hang-offs of the umbilical and the signal cable.

FIG. 3 shows the hang-off of the umbilical. The umbilical is hung-off on the offshore platform as known in the technical field. In this case the umbilical is hung-off at the reduced diameter 15.

The signal cables 7 are hung-off by means of a special construction separately from the hang-off of the umbilical.

A steel plate 12 is layered on a support 13, which may be a tube like element as the casing for the hung-off of the umbilical or may comprise several single rods. The plate is provided with bores 14 for each signal cable 7. The hang-off device for the signal cables 7 is well known in the technical field.

The separate hang-off of the signal cables 7 isolates the signal cables 7 from impact of increased friction factor (local stresses within the umbilical) when maximum tension and minimum bending radius occur for the umbilical. The signal cables 7 live their own life within the steel tube 7c, when the steel tubes 7c are hung-off separately from the umbilical. This gives the signal cables 7a potential of reaching deeper than 2000 meters and the same applies for the umbilical.

The invention claimed is:

1. Subsea umbilical comprising:
   electrically insulated power conductors;
   fiber optic elements;
   electrical signal cables; and
   fillers within a common outer cover, wherein at least one of said electrical signal cables is enclosed within a dedicated metal tube, and wherein the umbilical is hung off on an offshore platform and the metal tube containing the at least one electrical signal cable is hung off separately from the umbilical.

2. Subsea umbilical according to claim 1, wherein said signal cables are arranged off-set from the central umbilical axis.

3. Subsea umbilical according to claim 1, wherein said metal tube is made of duplex steel or super duplex steel.

4. Subsea umbilical according to claim 1, wherein the inner diameter of the metal tube is greater than the outer diameter of the electrical signal cable by a factor of 1.25.

5. Subsea umbilical according to claim 1, wherein the umbilical has a center core surrounded by the elements the signal cables and the fillers, wherein the center core has three of said power conductors.

6. Method of making an electrical signal cable to be used in a subsea umbilical according to claim 1, wherein the electrical signal cable is pulled into the metal tube by means of a pulling string.

* * * * *